(12) United States Patent
Morikawa (10) Patent No.: US 7,758,015 B2
(45) Date of Patent: Jul. 20, 2010

(54) SOLENOID-OPERATED VALVE CONTROLLER

(75) Inventor: Fumio Morikawa, Misato (JP)

(73) Assignee: SMC Kabushiki Kaisha, Tokyo (JP)

( * ) Notice: Subject to any disclaimer, the term of this patent is extended or adjusted under 35 U.S.C. 154(b) by 827 days.

(21) Appl. No.: 11/567,946

(22) Filed: Dec. 7, 2006

(65) Prior Publication Data

US 2007/0145316 A1 Jun. 28, 2007

(30) Foreign Application Priority Data

Dec. 27, 2005 (JP) ............... 2005-374555

(51) Int. Cl.
*F16K 31/02* (2006.01)

(52) U.S. Cl. ............ 251/129.04; 251/129.05; 251/129.1; 361/154

(58) Field of Classification Search ........... 251/129.04, 251/129.05, 129.1; 361/152, 153, 154
See application file for complete search history.

(56) References Cited

U.S. PATENT DOCUMENTS

| | | | | |
|---|---|---|---|---|
| 4,071,877 A | * | 1/1978 | Stewart et al. ............ 361/152 |
| 4,173,031 A | * | 10/1979 | Leichle ..................... 361/154 |
| 4,679,766 A | * | 7/1987 | Cuming ................. 251/129.04 |
| 4,925,156 A | * | 5/1990 | Stoll et al. ............. 251/129.01 |
| 5,108,070 A | * | 4/1992 | Tominaga ............... 251/129.1 |
| 6,164,323 A | | 12/2000 | Smith et al. |
| 6,634,338 B1 | * | 10/2003 | Yamakado et al. ....... 251/129.1 |

FOREIGN PATENT DOCUMENTS

| | | |
|---|---|---|
| DE | 37 23 712 | 1/1989 |
| JP | 3-213782 | 9/1991 |
| JP | 5-96654 | 12/1993 |
| JP | 8-145225 | 6/1996 |
| JP | 2001-349462 | 12/2001 |
| JP | 2003-021433 | 1/2003 |

* cited by examiner

*Primary Examiner*—John Bastianelli
(74) *Attorney, Agent, or Firm*—Paul A. Guss (57) ABSTRACT

A solenoid-operated valve controller includes a first signal line and a second signal line, which are connected respectively to ends of a first solenoid coil and a second solenoid coil. The first solenoid coil and the second solenoid coil have other ends, which are electrically connected in common to a switch. One of the first and second solenoid coils, which corresponds to signal states of a plurality of input signals that are supplied respectively to the first and second signal lines, is selected, and the switch is turned on and off to control the selected one of the first and second solenoid coils.

14 Claims, 8 Drawing Sheets

FIG. 8

SOLENOID-OPERATED VALVE CONTROLLER

BACKGROUND OF THE INVENTION

1. Field of the Invention

The present invention relates to a solenoid-operated valve controller for controlling a solenoid-operated valve having a plurality of solenoid coils.

2. Description of the Related Art

There has heretofore been known a double-solenoid-operated valve having two electromagnetically operated pilot valves that are actuated by solenoid mechanisms. This known type of double-solenoid-operated valve has a main spool for changing the direction of a flow of a main fluid, with two pistons disposed respectively on opposite axial ends of the main spool. The two solenoid mechanisms are alternately turned on and off to cause a pilot fluid to act alternately on the two pistons, thereby to shift the main spool.

Japanese Laid-Open Utility Model Publication No. 5-96654, for example, discloses a conventional double-solenoid-operated valve having two pistons having different diameters and disposed respectively on opposite axial ends of a main spool. While a pilot fluid pressure is applied to the smaller-diameter piston by a manual operation unit, one of the pilot valves is turned on or off to supply the pilot fluid to or discharge the pilot fluid from the larger-diameter piston, to thereby shift the main spool in the same manner as a single-solenoid-operated valve.

Another conventional double-solenoid-operated valve having two electromagnetically operated pilot valves, as disclosed in Japanese Laid-Open Patent Publication No. 8-145225, can be used as a single-solenoid-operated valve having a single pilot valve. When the disclosed valve is used as a double-solenoid-operated valve, the main spool is prevented from being shifted, even if the two pilot valves are simultaneously turned on in error.

There have heretofore been proposed power-saving techniques for actuating solenoid-operated valves. For example, Japanese Laid-Open Patent Publication No. 3-213782 reveals a solenoid-operated valve controller for applying a rated voltage to the solenoid coil of a solenoid-operated valve, for a predetermined period based on a drive command signal, and then applying a holding voltage lower than the rated voltage to the solenoid coil of the solenoid-operated valve, for a remaining period of the valve activation interval, thereby to actuate the solenoid-operated valve while achieving a power savings.

U.S. Pat. No. 6,164,323 discloses a solenoid valve control system, wherein a microprocessor operates according to control signals, so as to apply power at a 100% duty cycle to the solenoid coil of the valve for a predetermined period of time, to thereby move a movable member inside the solenoid coil, and then apply power at a reduced duty cycle to the solenoid coil, to thereby keep the valve activated at a reduced level of power consumption for a remaining period of the valve activation interval, thereby holding the movable member in position inside the solenoid coil.

Efforts have been made to reduce the size of double-solenoid-operated valves, and also to make structural changes for placing the two solenoid coils on one side. Because of such efforts, the space made available for installing control circuits for the two solenoid coils is reduced, so that individual control circuits for the respective solenoid coils cannot be installed within the available space.

The spool of the solenoid-operated valve, which is operated at a level of reduced power consumption, is held in place under weak forces. When a strong shock is applied to the solenoid-operated valve, the movable member tends to be shifted out of position, changing the fluid passages provided in the solenoid-operated valve. As a result, a cylinder that is actuated by fluid flowing through the fluid passages may operate unexpectedly.

The above drawback can be avoided by monitoring the state of the movable member of the solenoid-operated valve using a sensor. However, a solenoid-operated valve incorporating such a sensor and its associated circuitry becomes complex in structure and expensive to manufacture.

SUMMARY OF THE INVENTION

It is an object of the present invention to provide a solenoid-operated valve controller, which is effective to reduce the size of a solenoid-operated valve having a plurality of solenoid coils, such as a double-solenoid-operated valve, which can accommodate a reduction in space available for installing a control circuit for the solenoid-operated valve, and which is relatively inexpensive to manufacture.

Another object of the present invention is to provide a solenoid-operated valve controller, which is capable of holding a movable member of a solenoid-operated valve reliably in position depending on the manner in which the solenoid-operated valve is used, even though the solenoid-operated valve is actuated at a reduced level of power consumption. The solenoid-operated valve controller is capable of keeping the movable member held in position even when an external shock is applied to the solenoid-operated valve when the solenoid-operated valve is in operation.

According to the present invention, there is provided a solenoid-operated valve controller for controlling a solenoid-operated valve having a plurality of solenoid coils, comprising a switch, a plurality of signal lines wired in association with the solenoid coils, respectively, the signal lines being connected to respective ends of the solenoid coils, the solenoid coils having other ends electrically connected in common to the switch, and a control circuit for selecting at least one of the solenoid coils, which corresponds to signal states of a plurality of input signals that are supplied respectively to the signal lines, and turning on and off the switch in order to control the selected one of the solenoid coils.

The solenoid-operated valve, which may be referred to as a double-solenoid-operated valve, can be reduced in size, can be designed to accommodate a reduced space for installing a control circuit, and can be reduced in cost.

The control circuit selects from among at least two of the solenoid coils, which corresponds to signal states of a plurality of input signals that are supplied respectively to the signal lines, and turns off the switch for a period during which the control circuit selects at least two of the solenoid coils.

With the above arrangement, the solenoid coils are prevented from being energized simultaneously, so that the solenoid-operated valve will operate highly reliably.

The control circuit turns on and off the switch in order to energize the selected one of the solenoid coils in a rated power mode, in which the selected one of the solenoid coils is energized at a 100% duty cycle with electric power sufficient to move a movable member inside the selected one of the solenoid coils, and thereafter energizes the selected one of the solenoid coils in a reduced power mode, in which the selected one of the solenoid coils is energized at a duty cycle smaller than the 100% duty cycle in the rated power mode.

The control circuit energizes the selected one of the solenoid coils in the rated power mode and the reduced power mode during one cyclic period, and turns on and off the switch during the one cyclic period, which is assigned to a period in which the one of the solenoid coils is selected.

Alternatively, the control circuit energizes the selected one of the solenoid coils in the rated power mode and the reduced power mode during one cyclic period, and turns on and off the switch during two or more of the cyclic periods, which are assigned to a period in which the one of the solenoid coils is selected. With this arrangement, since the selected one of the solenoid coils is energized during two or more cyclic periods within the period in which the one of the solenoid coils is selected, the movable members inside the solenoid coils are held in position even when an external shock is applied. Further, the movable members are reliably held in position even when the selected one of the solenoid coils is energized in the reduced power mode. The movable members remain held in position even if an external shock is applied to the solenoid-operated valve during operation thereof.

The control circuit selects one of a plurality of prepared energization patterns, which corresponds to an input condition at a dedicated terminal of the control circuit, and turns on and off the switch based on the selected one of the energization patterns. Alternatively, the control circuit selects one of a plurality of prepared energization patterns, which corresponds to a condition stored in a memory incorporated in the control circuit, and turns on and off the switch based on the selected one of the energization patterns.

Such energization patterns are established depending on requirements for usage of the solenoid-operated valve, e.g., a location where the installed solenoid-operated valve must be highly reliable, or a location where the installed solenoid-operated valve may be less reliable. Accordingly, the solenoid-operated valve having plural solenoid coils therein is highly versatile in use.

The condition stored in the memory may comprise a condition, which is written into the memory after the control circuit has been installed on a wiring board. Specifically, if the control circuit incorporates a memory, such as a flash memory or the like with programs stored therein, then the programs can easily be changed on board. Since on-board program changes can be made when the solenoid-operated valve controller is shipped out of factory, or after the solenoid-operated valve controller has been delivered to the user, the solenoid-operated valve controller is highly convenient to use.

The control circuit turns on and off the switch during one cyclic period in order to energize the selected one of the solenoid coils in a rated power mode, in which the selected one of the solenoid coils is energized at a 100% duty cycle with electric power sufficient to move a movable member inside the selected one of the solenoid coils, and thereafter energizes the selected one of the solenoid coils in a reduced power mode, in which the selected one of the solenoid coils is energized at a duty cycle smaller than the 100% duty cycle in the rated power mode, wherein the energization patterns include a first energization pattern for assigning the one cyclic period to a period during which the one of the solenoid coils is selected, and a second energization pattern for assigning at least two of the cyclic periods to the period during which the one of the solenoid coils is selected.

The signal lines may also operate as corresponding power lines for the solenoid coils. With this arrangement, the number of wiring lines in the solenoid-operated valve controller is relatively small. The solenoid-operated valve, having plural solenoid coils therein, thus can be reduced in size, can be designed to accommodate a reduced space for installing the control circuit, and can be reduced in cost.

The one cyclic period should preferably be shorter than a period of time required for a fluid pressure device that is connected to the solenoid-operated valve for changing fluid passages based on shifting movement of the movable members of the solenoid-operated valve to start changing the fluid passages, as measured from the time when the movable members are shifted.

With the above arrangement, the movable members of the solenoid-operated valve are reliably held in position. Further, the movable members remain held in position even if an external shock is applied to the solenoid-operated valve during operation thereof.

In the solenoid-operated valve controller according to the present invention, a solenoid-operated valve having plural solenoid coils (referred to as a double-solenoid-operated valve) can be reduced in size, can be designed to accommodate a reduced space for installing the control circuit, and can be reduced in cost.

Even when the solenoid-operated valve is operated in the reduced power mode, the movable members within the solenoid-operated valve are reliably held in position, depending on the usage of the solenoid-operated valve. Further, the movable members remain held in position even if an external shock is applied to the solenoid-operated valve during operation thereof.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A solenoid-operated valve controller according to an embodiment of the present invention shall be described below with reference to FIGS. 1 through 8.

Figure 1:
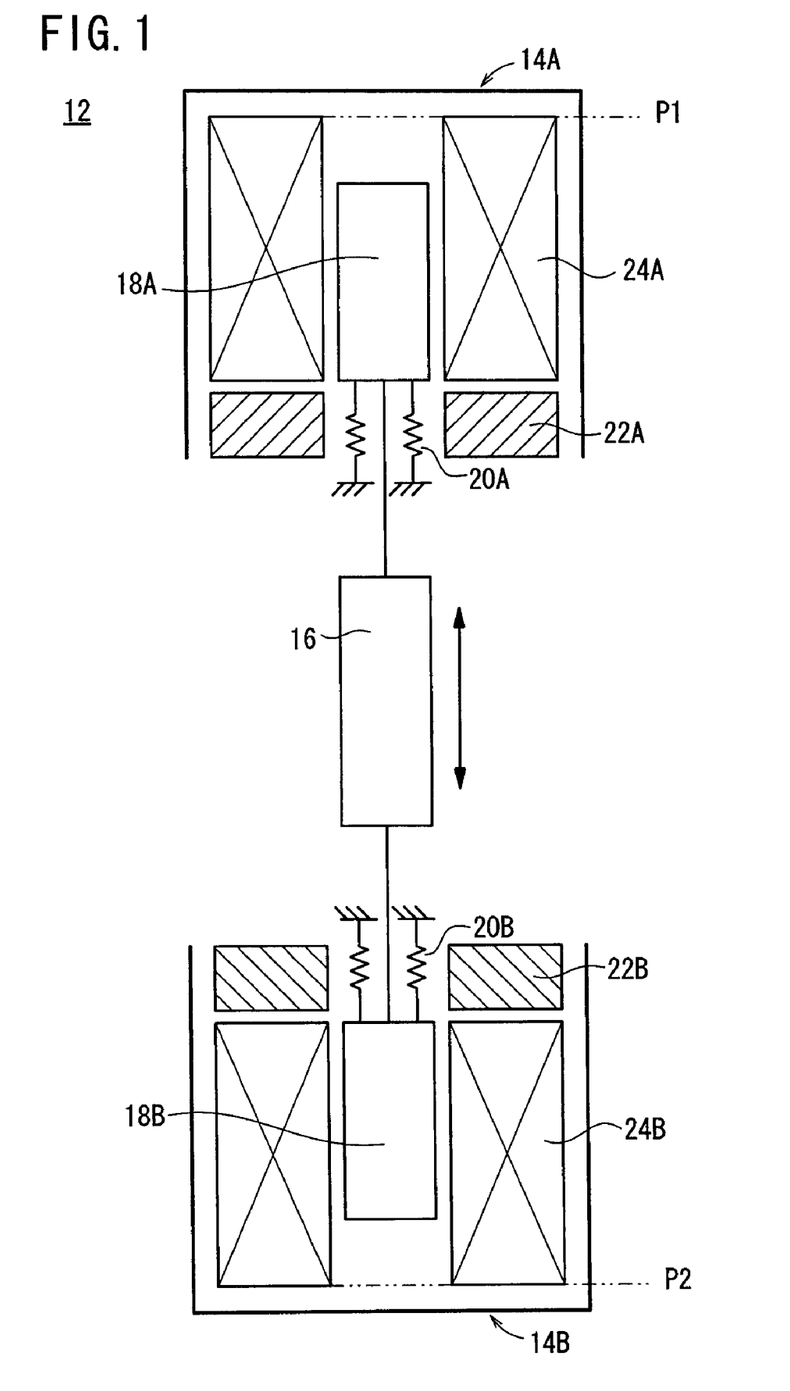
FIG. 1 is a schematic view showing a general arrangement of a solenoid-operated valve, which is controlled by a solenoid-operated valve controller according to an embodiment of the present invention.

FIG. 1 schematically shows a solenoid-operated valve 12, which is controlled by a solenoid-operated valve controller 10 according to an embodiment of the present invention. First, the solenoid-operated valve 12 shall be described.

As shown in FIG. 1, the solenoid-operated valve 12 is a self-held type of solenoid-operated valve, i.e., a latched solenoid-operated valve, which has two solenoids, i.e., a first solenoid 14A and a second solenoid 14B, therein. The solenoid-operated valve 12 described below is a five-port solenoid-operated valve, having an inlet port, a first outlet port, a second outlet port, a first discharge port, and a second discharge port, although not all of such ports are shown.

The first solenoid 14A comprises a first movable member 18A movable in two opposite directions, i.e., one direction and an opposite direction, with a valve spool 16 fixed to one end thereof, a first spring 20A for normally urging the first movable member 18A to move in the opposite direction, a first permanent magnet 22A for generating a magnetic field, and a first solenoid coil 24A for moving the first movable member 18A in the one direction for positioning the first movable member 18A in a first position P1.

The second solenoid 14B comprises a second movable member 18B movable in two opposite directions, i.e., one direction and an opposite direction, with the valve spool 16 fixed to one end thereof, a second spring 20B for normally urging the second movable member 18B to move in the one direction, a second permanent magnet 22B for generating a magnetic field, and a second solenoid coil 24B for moving the second movable member 18B in the opposite direction for positioning the second movable member 18B in a second position P2.

When the solenoid-operated valve 12 is in an initial state, the valve spool 16 is held in an intermediate position under forces from the first spring 20A and the second spring 20B, so as to close the inlet port, for example. In FIG. 1, the valve spool 16 is shown as being positioned in the intermediate position.

When the first solenoid coil 24A is energized, the first solenoid coil 24A generates a magnetic field, the direction of which is the same as the direction of the magnetic field generated by the first permanent magnet 22A. Therefore, the first movable member 18A is moved in the one direction, against the bias of the first spring 20A, and is positioned in the first position P1. The inlet port and the first outlet port, for example, as well as the second outlet port and the second discharge port, are now brought into fluid communication with each other, whereby the fluid flows from the inlet port to the first outlet port, and the fluid remaining in the second outlet port is discharged through the second discharge port. Thereafter, even when the first solenoid coil 24A is de-energized, the first movable member 18A remains in the first position P1 under the magnetic forces from the first permanent magnet 22A, thereby allowing the fluid to flow continuously from the inlet port to the first outlet port.

After the first solenoid coil 24A is de-energized, the second solenoid coil 24B is energized so as to generate a magnetic field. Since the magnetic field generated by the second solenoid coil 24B and the magnetic field generated by the second permanent magnet 22B are oriented in the same direction, the second movable member 18B is moved in the opposite direction against the bias of the second spring 20B, and is placed in the second position P2. The inlet port and the second outlet port, for example, as well as the first outlet port and the first discharge port, are now brought into fluid communication with each other, whereby the fluid flows from the inlet port to the second outlet port, and the fluid remaining in the first outlet port is discharged through the first discharge port. Thereafter, even when the second solenoid coil 24B is de-energized, the second movable member 18B remains in the second position P2 under the magnetic forces from the second permanent magnet 22B, thereby allowing the fluid to flow continuously from the inlet port to the second outlet port.

When the second solenoid coil 24B is de-energized, the valve spool 16 returns to its initial position, i.e., the intermediate position, thus closing the first inlet port. At this time, since the first outlet port and the first discharge port, as well as the second outlet port and the second discharge port, are held in fluid communication with each other, the fluid remaining in the second outlet port is discharged through the second discharge port.

The solenoid-operated valve controller 10 shall be described in detail below with reference to FIG. 2.

Figure 2:
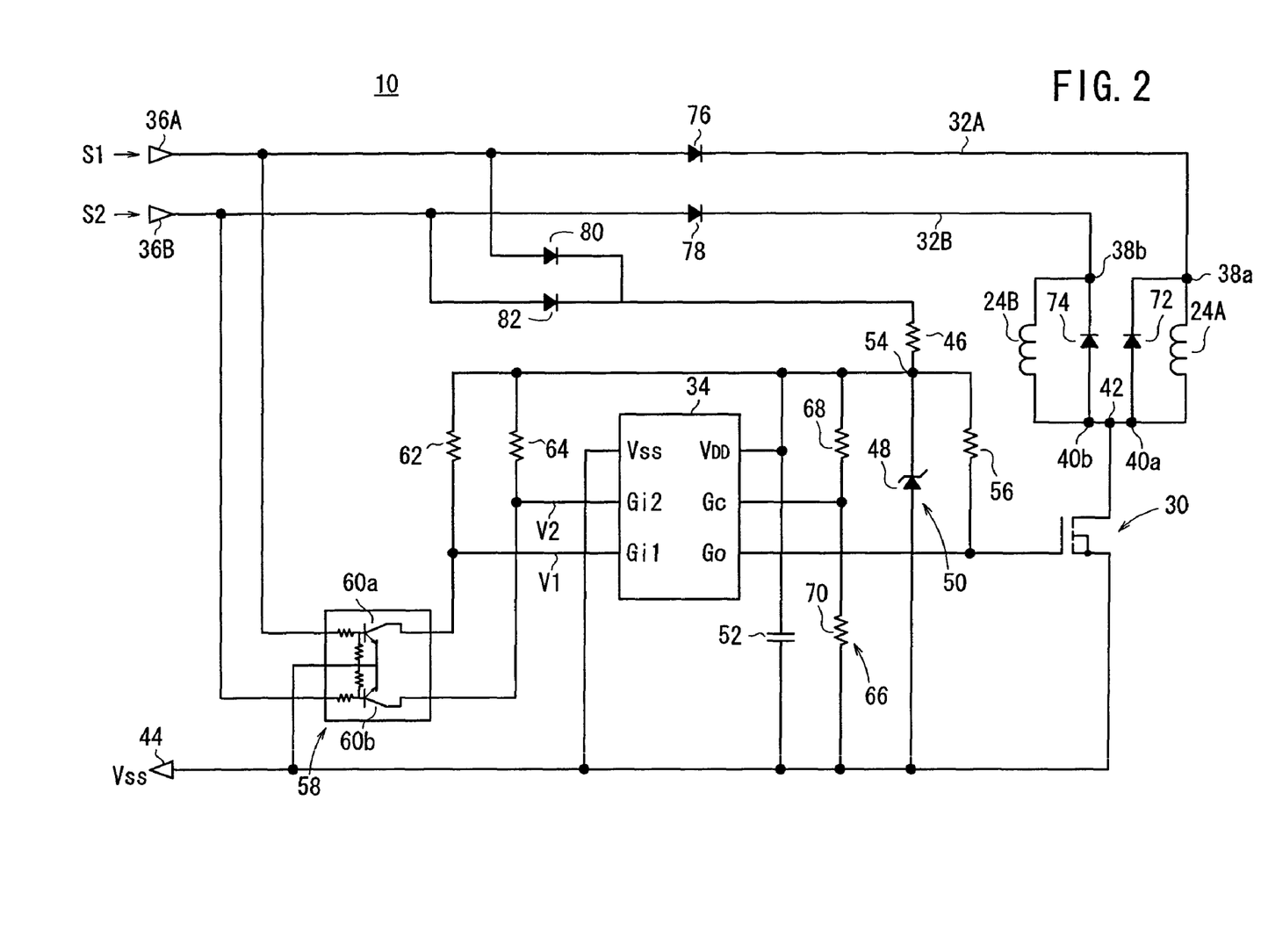
FIG. 2 is a circuit diagram of the solenoid-operated valve controller.

As shown in FIG. 2, the solenoid-operated valve controller 10 includes a switch 30, two signal lines 32A, 32B connected respectively to the first solenoid coil 24A and the second solenoid coil 24B, and a control circuit 34 for turning on and off the switch 30.

A first input terminal 36A is connected to one end of the first signal line 32A, whereas the other end of the first signal line 32A is connected to an end 38a of the first solenoid coil 24A. Similarly, a second input terminal 36B is connected to one end of the second signal line 32B, whereas the other end of the second signal line 32B is connected to an end 38b of the second solenoid coil 24B. The switch 30 may comprise an n-channel FET or a p-channel FET. In the following description, it shall be assumed that the switch 30 comprises an n-channel FET.

The first and second solenoid coils 24A, 24B have respective other ends 40a, 40b, which are connected in common to a contact 42 that is electrically connected to a drain terminal of the switch 30. The switch 30 also has a source connected to a reference terminal 44. Preferably, the reference terminal 44 is connected to a ground potential (Vss).

The control circuit 34 preferably comprises a microprocessor, including a CPU (not shown) for executing a program for turning on and off the switch 30. The control circuit 34 includes at least a power supply terminal $V_{DD}$, a first control input terminal Gi1, a second control input terminal Gi2, a control output terminal Go, a dedicated terminal Gc, and a terminal Vss.

A constant-voltage circuit 50, comprising a first resistor 46 and a zener diode 48 that are connected in series to each other, is connected between the first and second signal lines 32A, 32B and the reference terminal 44. When the control circuit 34 is operating, an output voltage (e.g., 5 V) from the constant-voltage circuit 50 is applied as a power supply voltage to the power supply terminal $V_{DD}$ of the control circuit 34. The terminal Vss of the control circuit 34 is connected to the reference terminal 44. A capacitor 52 is connected between the power supply terminal $V_{DD}$ and the reference terminal 44, in order to stabilize the voltage applied to the power supply terminal $V_{DD}$.

The control output terminal Go of the control circuit 34 is connected to the gate terminal of the switch 30. A pull-up resistor 56 is connected between the gate terminal of the switch 30 and a junction (contact) 54 between the first resistor 46 and the zener diode 48 of the constant-voltage circuit 50. When the control output terminal Go of the control circuit 34 has a high impedance, the output voltage (e.g., 5 V) from the constant-voltage circuit 50 is applied through the pull-up resistor 56 to the gate terminal of the switch 30, thereby turning on the switch 30. When the control output terminal Go of the control circuit 34 is at a low level (e.g., 0 V), the switch 30 is turned off. The pull-up resistor 56 may be dispensed with if the control circuit 34 itself incorporates a pull-up resistor therein.

A detection circuit 58 is connected to the control circuit 34 for detecting a signal state of a first input signal S1, which is supplied to the first input terminal 36A, and a signal state of a second input signal S2, which is supplied to the second input terminal 36B.

The first input signal S1 and the second input signal S2 have a high level, which is selected to be a rated voltage of the first solenoid coil 24A and the second solenoid coil 24B (e.g., 24 V). The first input signal S1 and the second input signal S2 have a low level, which is selected to be 0 V, for example. Therefore, the first signal line 32A and the second signal line 32B serve a dual function as corresponding power lines for the first solenoid coil 24A and the second solenoid coil 24B.

The detection circuit 58 comprises two npn transistors, i.e., a first transistor 60a and a second transistor 60b, having respective emitter terminals connected in common. The first input terminal 36A is connected to the base terminal of the first transistor 60a, and the second input terminal 36B is connected to the base terminal of the second transistor 60b. The common emitter terminal is connected to the reference terminal 44. A second resistor 62 is connected between the collector terminal of the first transistor 60a and the junction 54 of the constant-voltage circuit 50, and a third resistor 64 is connected between the collector terminal of the second transistor 60b and the junction 54 of the constant-voltage circuit 50. The collector terminal of the first transistor 60a is connected to the first control input terminal Gi1 of the control circuit 34, whereas the collector terminal of the second transistor 60b is connected to the second control input terminal Gi2 of the control circuit 34.

If the first input signal S1 supplied to the first input terminal 36A is at a high level, and the second input signal S2 supplied to the second input terminal 36B is at a low level, then since the first transistor 60a is turned on and the second transistor 60b is turned off, in this case, the first input voltage V1 applied to the first control input terminal Gi1 of the control circuit 34 is at a low level (e.g., 0 V), and the second input voltage V2 applied to the second control input terminal Gi2 of the control circuit 34 is at a high level (e.g., 5 V).

Conversely, if the first input signal S1 is at a low level, and the second input signal S2 is at a high level, then since the first transistor 60a is turned off and the second transistor 60b is turned on, in this case, the first input voltage V1 applied to the first control input terminal Gi1 is at a high level, and the second input voltage V2 applied to the second control input terminal Gi2 is at a low level.

If both the first input signal S1 and the second input signal S2 are at a low level, then since both the first transistor 60a and the second transistor 60b are turned off, both the first input voltage V1 applied to the first control input terminal Gi1 and the second input voltage V2 applied to the second control input terminal Gi2 are at a high level.

Conversely, if both the first input signal S1 and the second input signal S2 are at a high level, then since both the first transistor 60a and the second transistor 60b are turned on, both the first input voltage V1 and the second input voltage V2 are at a low level.

A program switcher 66 is connected in parallel with the zener diode 48 of the constant-voltage circuit 50. The program switcher 66 serves to select one of three programs stored in a memory, such as a flash memory or the like, which is incorporated within the control circuit 34. In FIG. 2, the program switcher 66 comprises either a fourth resistor 68, which is connected between the dedicated terminal Gc of the control circuit 34 and the junction 54 of the constant-voltage circuit 50, or a fifth resistor 70, which is connected between the dedicated terminal Gc of the control circuit 34 and the reference terminal 44, for selecting either one of two programs.

A surge-absorbing first diode 72 is connected in parallel with the first solenoid coil 24A, and a surge-absorbing second diode 74 is connected in parallel with the second solenoid coil 24B. Reverse-blocking third and fourth diodes 76, 78 are connected respectively to the first signal line 32A and to the second signal line 32B. A reverse-blocking fifth diode 80 is connected between the first input terminal 36A and the first resistor 46, and a reverse-blocking sixth diode 82 is connected between the second input terminal 36B and the first resistor 46.

Circuit operations of the solenoid-operated valve controller 10 shall be described below with reference to FIG. 3.

Figure 3:
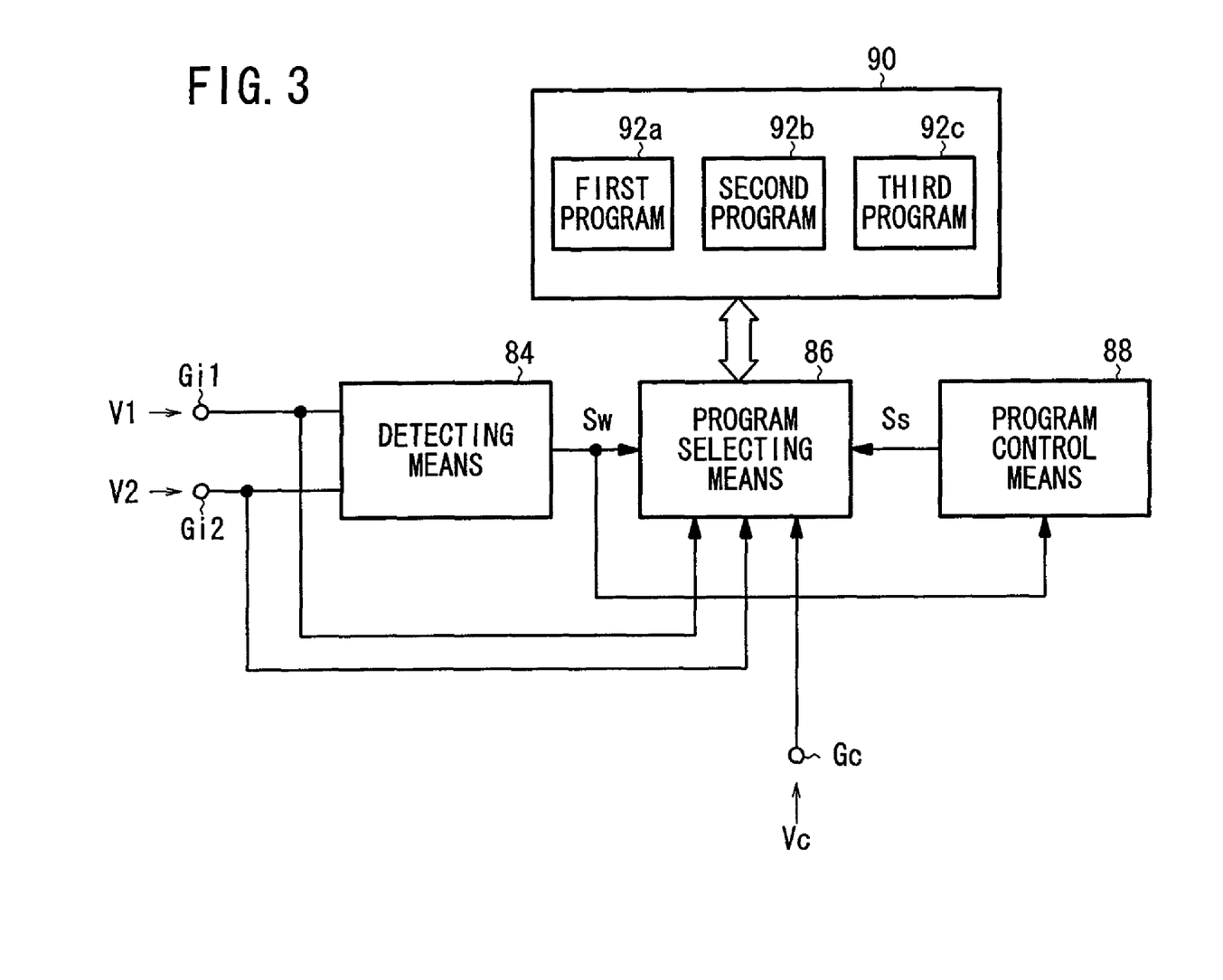
FIG. 3 is a block diagram showing functions of a control circuit for the solenoid-operated valve controller.

As shown in FIG. 3, a program that is run by the CPU of the control circuit 34 includes a detecting means 84, a program selecting means 86, and a program control means 88.

The detecting means 84 outputs an internal interrupt signal Sw if the first input voltage V1 and/or the second input voltage V2 at the first control input terminal Gi1 and/or the second control input terminal Gi2 has changed.

The program selecting means 86 selects and executes one of a plurality of programs, i.e., first through third programs 92a, 92b, 92c, which are stored in a memory 90 within the control circuit 34. Specifically, based on the internal interrupt signal Sw from the detecting means 84, the program selecting means 86 selects and executes a program depending on a combination of attributes (voltage levels) of the first input voltage V1 and the second input voltage V2, which are supplied respectively to the first control input terminal Gi1 and the second control input terminal Gi2, and the voltage Vc that is supplied to the dedicated terminal Gc.

When the program control means 88 is supplied with the internal interrupt signal Sw from the detecting means 84, if a program is currently being executed, then the program control means 88 outputs an end request signal Ss in order to shut down the program being executed.

Operational details for selecting, executing, and terminating programs shall be described below with reference to FIGS. 2 through 8.

Figure 4:
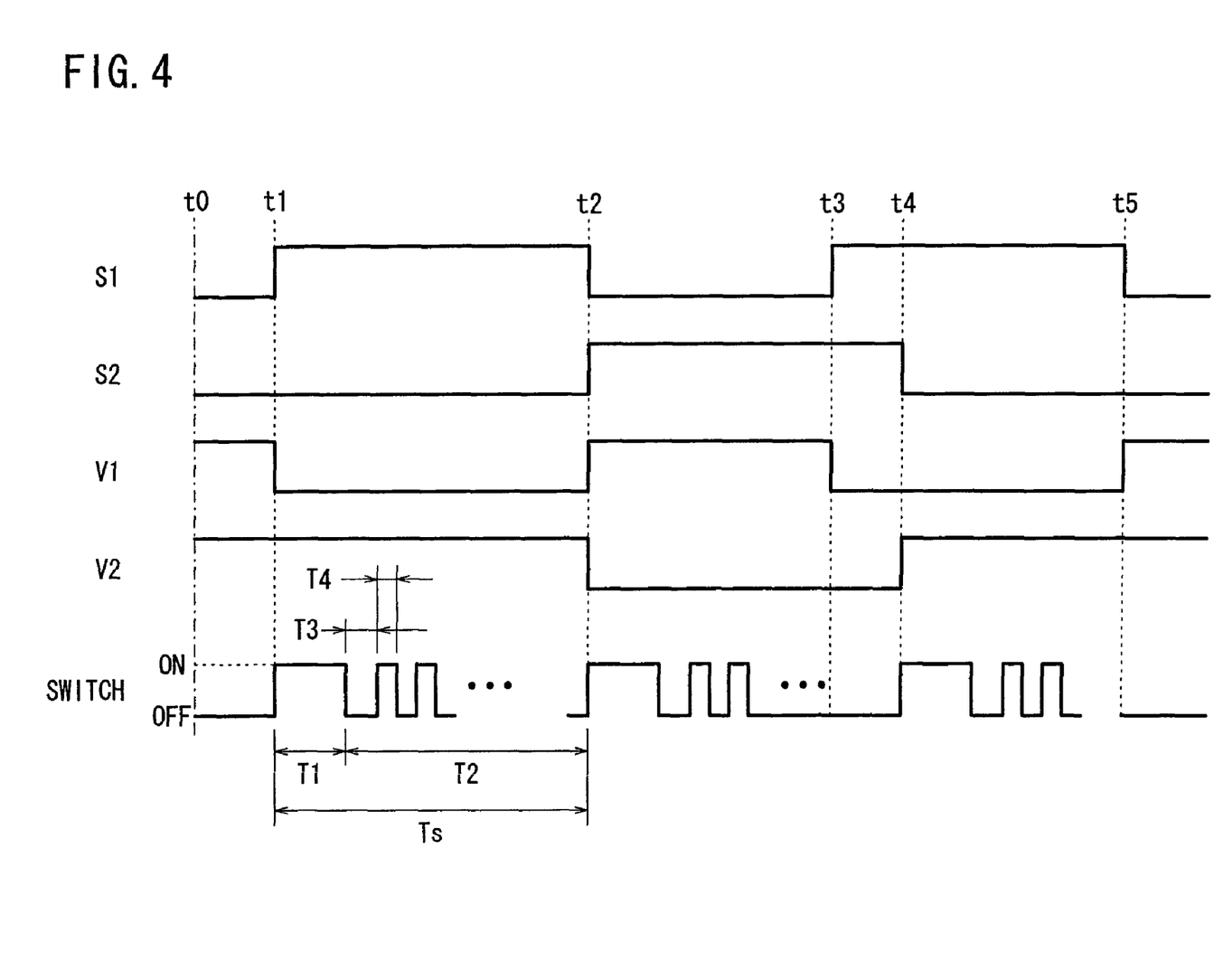
FIG. 4 is a timing chart illustrating a processing sequence of the control circuit of the solenoid-operated valve controller, and particularly, showing a processing sequence based on a second program.

If both the first input voltage V1 and the second input voltage V2 are at a high level, i.e., when both the first input signal S1 and the second input signal S2 are at a low level, such as when the control circuit 34 is initially activated, or at time t0 shown in FIG. 4, then the program selecting means 86 selects and executes the first program 92a stored in the memory 90.

Figure 5:
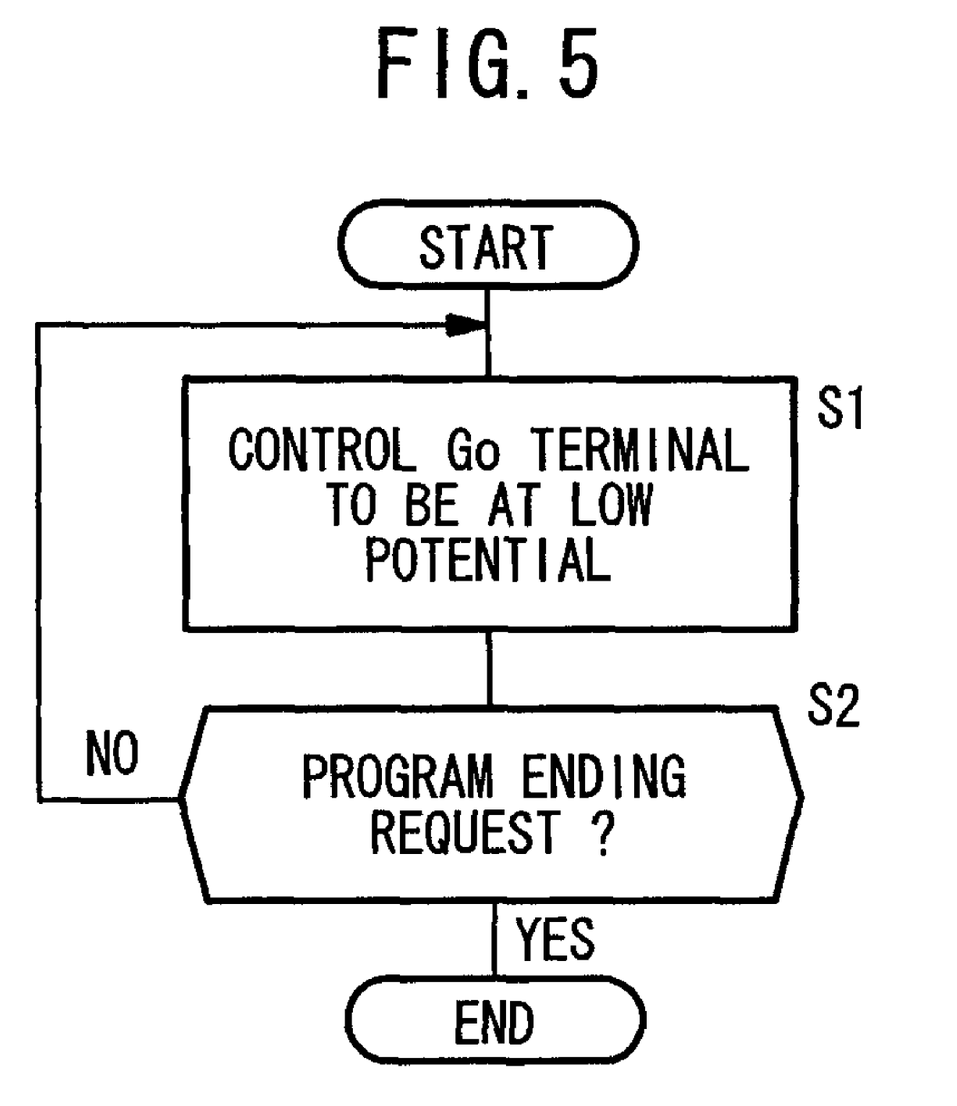
FIG. 5 is a flowchart, which shows a processing sequence of a first program.

The processing sequence for the first program 92a shall be described below with reference to FIG. 5. In step S1 of FIG. 5, the control output terminal Go is controlled so as to be at a low potential, e.g., the ground potential Vss. For example, a switch in the form of an internal transistor, the collector terminal of which is connected to the control output terminal Go, is turned on so that the control output terminal Go is brought to the low potential.

Since the control output terminal Go is placed at the low potential, the switch 30 remains turned off, thereby keeping the first solenoid coil 24A and the second solenoid coil 24B de-energized.

Thereafter, in step S2, it is determined whether or not there is an end request to shut down the first program 92a, by ascertaining whether an end request signal Ss has been input from the program control means 88. If an end request to shut down the first program has not been input, then control returns to step S1, thus keeping the first solenoid coil 24A and the second solenoid coil 24B de-energized.

When the levels of the first input voltage V1 and the second input voltage V2 are changed, such as at time t1 or time t4 shown in FIG. 4, the program control means 88 outputs an end request signal Ss, thereby shutting down the first program 92a being executed.

Then, if the first input voltage V1 is at a low level and the second input voltage V2 is at a high level, i.e., if the first input signal S1 is at a high level and the second input signal S2 is at a low level, and also if the dedicated terminal Gc is at a high level, i.e., if the fourth resistor 68 is connected, such as at time t1 shown in FIG. 4, or if the first input voltage V1 is at a high level and the second input voltage V2 is at a low level, i.e., if the first input signal S1 is at a low level and the second input signal S2 is at a high level, and also if the dedicated terminal Gc is at a high level, such as at time t2 shown in FIG. 4, then the program selecting means 86 selects and executes the second program 92b stored in the memory 90.

Figure 6:
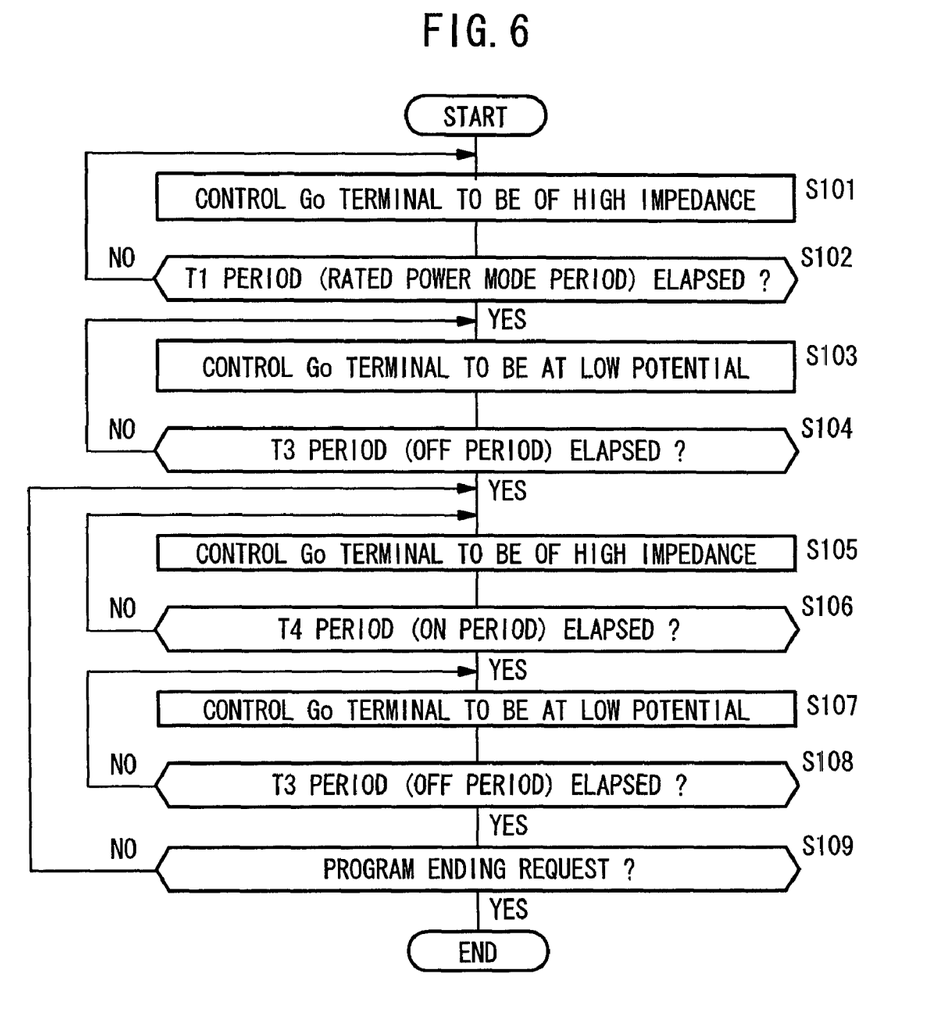
FIG. 6 is a flowchart, which shows a processing sequence of a second program.

A processing sequence of the second program 92b shall be described below with reference to FIG. 6.

The second program 92b, as shown in FIG. 4, serves to supply a rated power and a reduced power during one cyclic period Ts. Particularly, the second program 92b turns the switch 30 on and off during one cyclic period Ts, which is assigned to a period in which one solenoid coil (i.e., the first solenoid coil 24A or the second solenoid coil 24B) is selected.

First, a rated power supply mode is performed. In the rated power supply mode, the control output terminal Go is controlled, in step S101 shown in FIG. 6, to be of a high impedance. For example, a switch in the form of an internal transistor, the collector terminal of which is connected to the control output terminal Go, is turned off so as to bring the control output terminal Go to the high impedance.

Since the control output terminal Go exhibits the high impedance, the switch 30 is turned on, thereby initiating energization of the first solenoid coil 24A and the second solenoid coil 24B.

In step S102, it is determined whether or not a predetermined first period T1 (e.g., 10 ms.) has elapsed. During the first period T1, the control output terminal Go remains at the high impedance. The first period T1 is measured by counting clock pulses, not shown, which are supplied to the control circuit 34. Other periods are also measured in the same manner.

Also, during the first period T1, the switch 30 is turned on, in order to apply the rated voltage (the first input signal S1 or the second input signal S2) to the first solenoid coil 24A or to the second solenoid coil 24B, thereby energizing either the first solenoid coil 24A or the second solenoid coil 24B at the rated voltage. During this time, the first solenoid coil 24A or the second solenoid coil 24B is energized with the rated power at a 100% duty cycle.

The first period T1 is set to a period, which is long enough to move the first movable member 18A or the second movable member 18B inside the first solenoid coil 24A or the second solenoid coil 24B, while the solenoid coil is energized with the rated power. Since sufficient power to move the first movable member 18A or the second movable member 18B is supplied during the first period T1, the first movable member 18A is positioned at the first position P1, or the second movable member 18B is positioned at the second position P2, during the first period T1.

If it is judged that the first period T1 has elapsed in step S102, then the control output terminal Go is controlled, in step S103, so as to switch from a high impedance to a low potential. The switch 30 is turned off, to stop energizing the first solenoid coil 24A or the second solenoid coil 24B.

Thereafter, in step S104, it is determined whether or not a predetermined OFF period T3 (e.g., 60 μs) has elapsed. During the OFF period T3, the control terminal Go is maintained at the low potential.

If it is judged that the OFF period T3 has elapsed in step S104, then a next reduced power mode is performed.

In the reduced power mode, the control output terminal Go is controlled, in step S105, so as to switch from the low potential to the high impedance. The switch 30 is turned on again, for resuming energization of the first solenoid coil 24A or the second solenoid coil 24B.

In step S106, it is determined whether or not a predetermined ON period T4 (e.g., 60 μs) has elapsed. During the ON period T4, the control terminal Go remains at the high impedance.

If it is judged in step S106 that the ON period T4 has elapsed, then the control output terminal Go is controlled, in step S107, to switch from the high impedance to the low potential again. The switch 30 is turned off, to stop energizing the first solenoid coil 24A or the second solenoid coil 24B.

Thereafter, in step S108, it is determined whether or not the predetermined OFF period T3 (e.g., 60 μs) has elapsed. In the OFF period T3, the control terminal Go is maintained at the low potential.

If it is judged, in step S108, that the OFF period T3 has elapsed, then it is determined whether there is an end request to shut down the second program 92b, by ascertaining, in step S109, if an end request signal Ss has been input or not from the program control means 88. If an end request to shut down the second program has not been input, then control goes back to step S105, and the reduced power mode is repeated.

When the levels of the first input voltage V1 and the second input voltage V2 are changed, such as at time t2 or time t3 or time t5 shown in FIG. 4, the program control means 88 outputs an end request signal Ss, for shutting down the second program 92b being executed.

Figure 7:
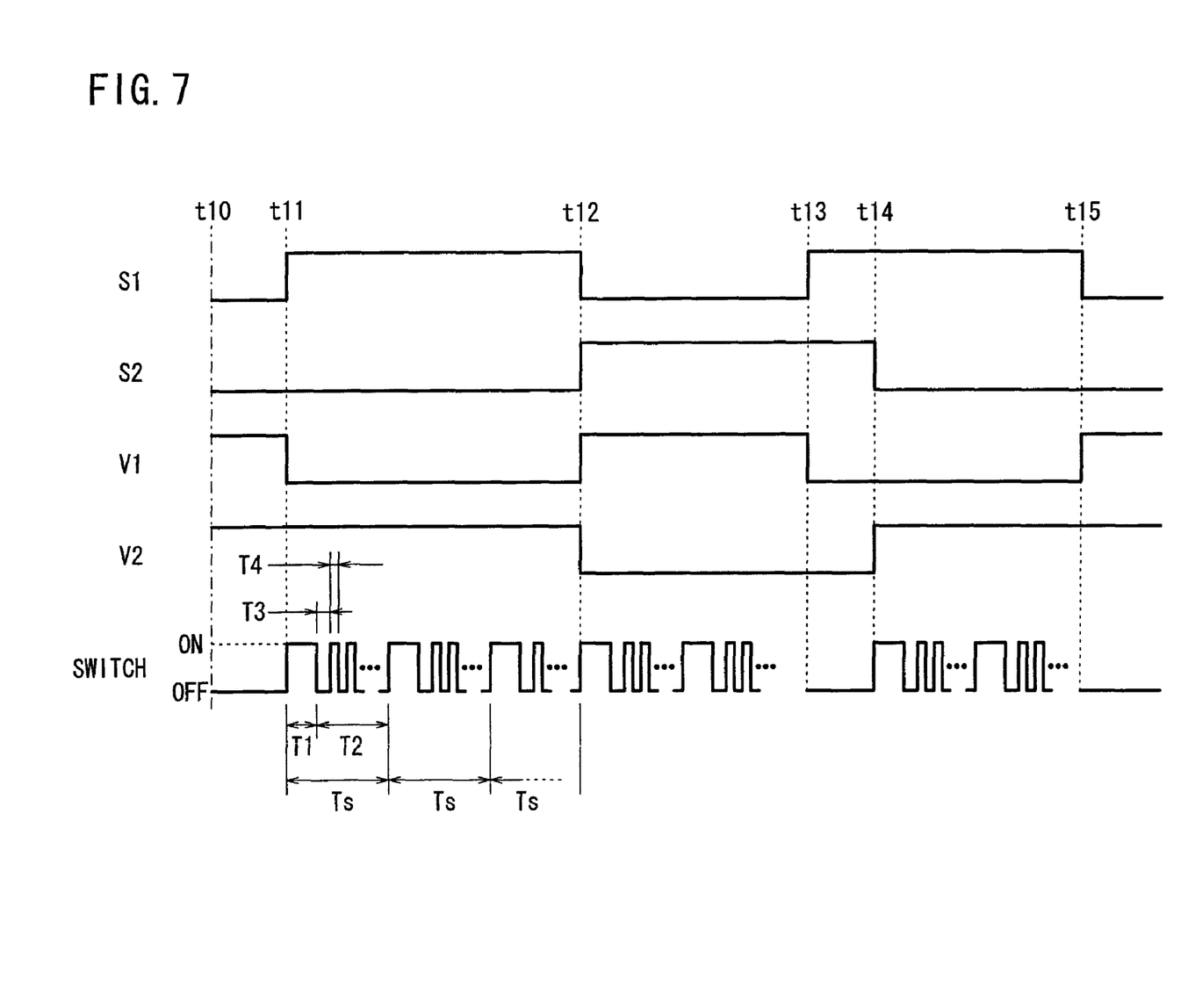
FIG. 7 is a timing chart illustrating a processing sequence of the control circuit of the solenoid-operated valve controller, and particularly, showing a processing sequence based on a third program.

Then, if the first input voltage V1 is at a low level and the second input voltage V2 is at a high level, i.e., if the first input signal S1 is at a high level and the second input signal S2 is at a low level, and also if the dedicated terminal Gc is at a low level, i.e., if the fifth resister 70 is connected, such as at time t11 shown in FIG. 7, or if the first input voltage V1 is at a high level and the second input voltage V2 is at a low level, i.e., if the first input signal S1 is at a low level and the second input signal S2 is at a high level, and also if the dedicated terminal Gc is at a low level, such as at time t12 shown in FIG. 7, then the program selecting means 86 selects and executes the third program 92c stored in the memory 90.

Figure 8:
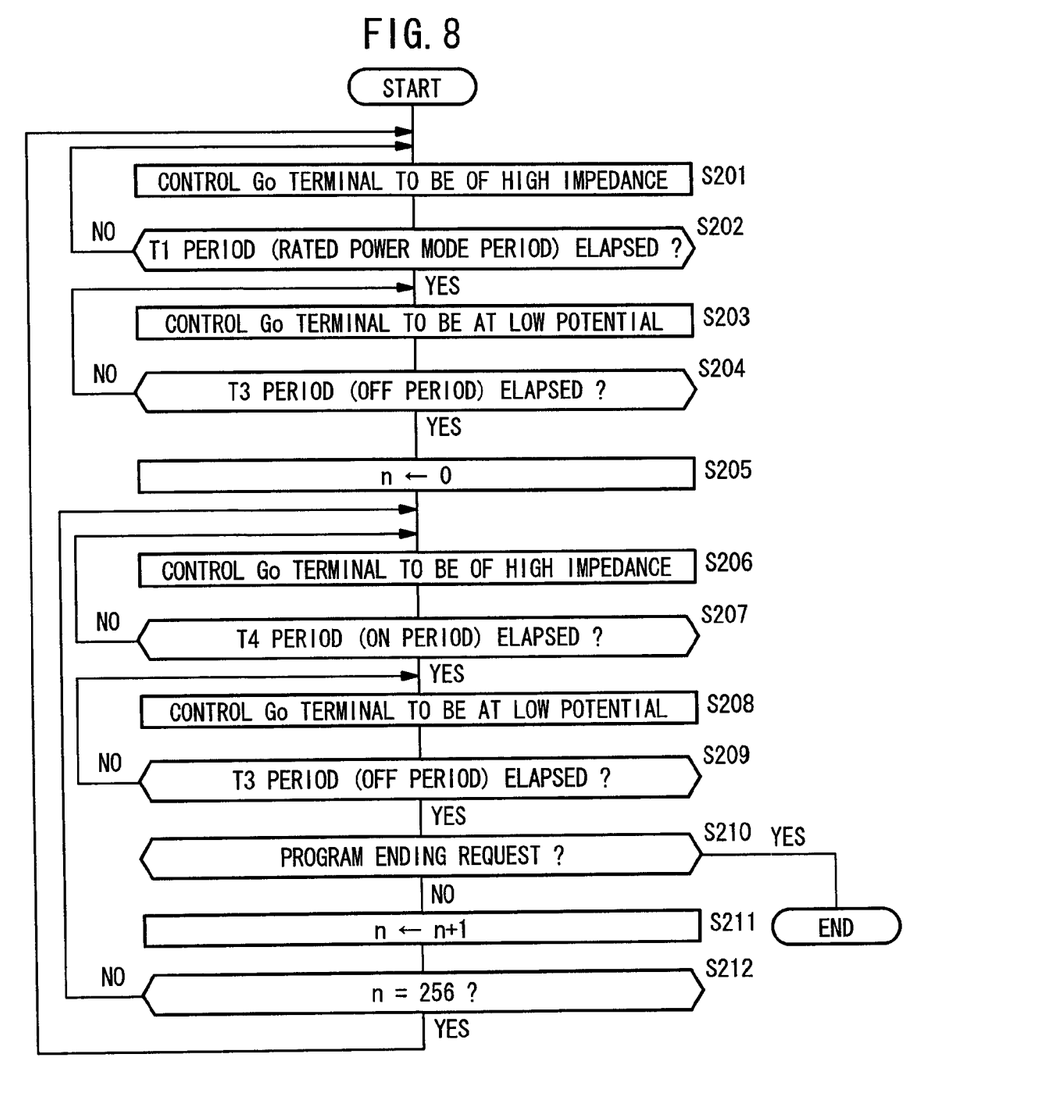
FIG. 8 is a flowchart, which shows a processing sequence of the third program.

A processing sequence of the third program 92c shall be described below with reference to FIG. 8.

As shown in FIG. 7, the third program 92c serves to supply a rated power and a reduced power within one cyclic period Ts. In particular, the third program 92c turns the switch 30 on and off within two or more cyclic periods Ts, assigned to a period in which one solenoid coil, i.e., the first solenoid coil 24A or the second solenoid coil 24B, is selected.

First, a rated power supply mode is performed. During the rated power supply mode, in step S201 shown in FIG. 8, the control output terminal Go is controlled so as to be of a high impedance.

Since the control output terminal Go is of a high impedance, the switch 30 is turned on, initiating energization of the first solenoid coil 24A and the second solenoid coil 24B.

In step S202, it is determined whether or not a predetermined first period T1 (e.g., 10 ms.) has elapsed. In the first period T1, the control output terminal Go remains at the high impedance.

In the first period T1, the switch 30 is turned on, applying the rated voltage to the first solenoid coil 24A or to the second solenoid coil 24B, in order to energize the first solenoid coil 24A or the second solenoid coil 24B at the rated voltage.

During this time, the first solenoid coil 24A or the second solenoid coil 24B is energized with the rated power at a 100% duty cycle.

If it is judged that the first period T1 has elapsed in step S202, then in step S203 the control output terminal Go is controlled so as to switch from the high impedance to a low potential. The switch 30 is turned off, to stop energizing the first solenoid coil 24A or the second solenoid coil 24B.

Thereafter, in step S204, it is determined whether or not a predetermined OFF period T3 (e.g., 60 μs) has elapsed. During the OFF period T3, the control terminal Go is maintained at the low potential.

If it is judged in step S204 that the OFF period T3 has elapsed, then a next reduced power mode is performed.

In the reduced power mode, in step S205, the number n, which is representative of the number of intermittent pulses during a second period T2, is initialized to 0. Thereafter, in step S206, the control output terminal Go is controlled so as to switch from the low potential to the high impedance. The switch 30 is turned on again, resuming energization of the first solenoid coil 24A or the second solenoid coil 24B.

In step S207, it is determined whether or not a predetermined ON period T4 (e.g., 60 μs) has elapsed. During the ON period T4, the control terminal Go remains at the high impedance.

In step S207, if it is judged that the ON period T4 has elapsed, then the control output terminal Go is controlled so as to switch from the high impedance to the low potential again in step S208. The switch 30 is turned off, to stop energizing the first solenoid coil 24A or the second solenoid coil 24B.

Thereafter, in step S209, it is determined whether or not the predetermined OFF period T3 (e.g., 60 μs) has elapsed. In the OFF period T3, the control terminal Go is maintained at the low potential.

If it is judged that the OFF period T3 has elapsed in step S209, then in step S210 it is determined whether or not there has been an end request to shut down the third program 92c, by ascertaining if an end request signal Ss has been input from the program control means 88. If an end request to shut down the third program has not been input, then in step S211 the number n is incremented by +1. Thereafter, it is determined in step S212 whether or not the number n is equal to or greater than a predetermined number N (e.g., 256), which is representative of the number of intermittent pulses during the second period T2.

The predetermined number N, i.e., the number of intermittent pulses during the second period T2, is selected depending on specifications of the solenoid-operated valve controller 10. Preferably, the predetermined number N should be established in relation to the operation of a fluid pressure device, such as a cylinder or the like, which is connected to the solenoid-operated valve 12. Specifically, the fluid pressure device is a device for changing fluid passages, based on shifting movements of the first and second movable members 18A, 18B of the solenoid-operated valve 12. The predetermined number N, i.e., the number of intermittent pulses during the second period T2, should be established such that a time duration of one cycle (cyclic period Ts), comprising the first period T1 and the second period T2, is shorter than a period of time required for the fluid pressure device to start changing the fluid passages, as measured from the time when the first and second movable members 18A, 18B are shifted. In the illustrated embodiment, the pulse period of the intermittent pulses during the second period T2 is substantially 120 μm, and the number of intermittent pulses is 256.

In step S212, if it is judged that the number n is not equal to or greater than the predetermined number N, then control returns to step S206, and the reduced power mode is repeated. Steps S206 through S211 are repeated to generate 256 intermittent pulses during the second period T2.

In step S212, if it is judged that the number n is equal to or greater than the predetermined number N, then control returns to step S201, so as to repeat the rated power mode and the reduced power mode.

When the levels of the first input voltage V1 and the second input voltage V2 are changed, such as at time t12 or time t13 or time t15 shown in FIG. 7, the program control means 88 outputs an end request signal Ss, thereby shutting down the third program 92c being executed.

If both the first input voltage V1 and the second input voltage V2 are at a low level, i.e., if both the first input signal S1 and the second input signal S2 are at a high level, such as at time t3 shown in FIG. 4 or at time t13 shown in FIG. 7, then the program selecting means 86 selects and executes the first program 92a stored in the memory 90. Operations of the first program 92a have already been described above and shall not be described below.

Processing operations of the solenoid-operated valve controller 10 shall be described below with reference to FIGS. 4 and 7.

First, it is assumed that the program switcher 66 comprises the fourth resistor 68 connected between the dedicated terminal Gc of the control circuit 34 and the junction 54 of the constant-voltage circuit 50, applying a high-level voltage to the dedicated terminal Gc of the control circuit 34.

If both the first input signal S1 and the second input signal S2 are at a low level, such as when the control circuit 34 is initially activated or at time t0 shown in FIG. 4, then since the high-level first input voltage V1 is applied to the first control input terminal Gi1 and the high-level second input voltage V2 is applied to the second control input terminal Gi2, the program selecting means 86 selects and executes the first program 92a stored in the memory 90. When the first program 92a is executed, both the first solenoid coil 24A and the second solenoid coil 24B are de-energized.

When the first input signal S1 goes high in level, at time t1, the first input voltage V1 applied to the first control input terminal Gi1 changes to a low level. The program selecting means 86 terminates the first program 92a being executed, and selects and executes the second program 92b. When the second program 92b is executed, the first solenoid coil 24A is supplied with a rated power and a reduced power during one cycle, for a period during which the first input signal S1 is at a high level.

When the first input signal S1 goes low in level and the second input signal S2 goes high in level, at time t2, the first input voltage V1 changes to a high level, and the second input voltage V2 changes to a low level. Therefore, the program selecting means 86 terminates the second program 92b being executed, and selects and executes the second program 92b again. When the second program 92b is executed, the second solenoid coil 24B is supplied with a rated power and a reduced power during one cycle, for a period during which the second input signal S2 is at a high level.

When the first input signal S1 goes high in level, at time t3, the first input voltage V1 goes low in level. The program selecting means 86 terminates the second program 92b being executed, and selects and executes the first program 92a. When the first program 92a is executed, both the first solenoid coil 24A and the second solenoid coil 24B are de-energized.

When the second input signal S2 goes low in level, at time t4, the second input voltage V2 goes high in level. The program selecting means 86 terminates the first program 92*a* being executed, and selects and executes the second program 92*b*. When the second program 92*b* is executed, the first solenoid coil 24A is supplied with a rated power and a reduced power during one cycle, for a period during which the first input signal S1 is at a high level.

When the first input signal S1 goes low in level, at time t5, the first input voltage V1 goes high in level. The program selecting means 86 terminates the second program 92*b* being executed, and selects and executes the first program 92*a*. When the first program 92*a* is executed, both the first solenoid coil 24A and the second solenoid coil 24B are de-energized.

It shall now be assumed that the program switcher 66 comprises the fifth resistor 70, which is connected between the dedicated terminal Gc of the control circuit 34 and the reference terminal 44, for applying a low-level voltage to the dedicated terminal Gc of the control circuit 34.

If both the first input signal S1 and the second input signal S2 are at a low level, such as when the control circuit 34 is initially activated or at time t10 shown in FIG. 7, then since the high-level first input voltage V1 is applied to the first control input terminal Gi1 and the high-level second input voltage V2 is applied to the second control input terminal Gi2, the program selecting means 86 selects and executes the first program 92*a* stored in the memory 90. When the first program 92*a* is executed, both the first solenoid coil 24A and the second solenoid coil 24B are de-energized.

When the first input signal S1 goes high in level, at time t11, the first input voltage V1 applied to the first control input terminal Gi1 changes to a low level. The program selecting means 86 terminates the first program 92*a* being executed, and selects and executes the third program 92*c*. When the third program 92*c* is executed, the first solenoid coil 24A is supplied with a rated power and a reduced power during two cycles or more, for a period during which the first input signal S1 is at a high level.

When the first input signal S1 goes low in level and the second input signal S2 goes high in level, at time t12, the first input voltage V1 changes to a high level, and the second input voltage V2 changes to a low level. Therefore, the program selecting means 86 terminates the third program 92*c* being executed, and selects and executes the third program 92*c* again. When the third program 92*c* is executed, the second solenoid coil 24B is supplied with a rated power and a reduced power during two cycles or more, for a period during which the second input signal S2 is at a high level.

When the first input signal S1 goes high in level, at time t13, the first input voltage V1 goes low in level. The program selecting means 86 terminates the third program 92*c* being executed, and selects and executes the first program 92*a*. When the first program 92*a* is executed, both the first solenoid coil 24A and the second solenoid coil 24B are de-energized.

When the second input signal S2 goes low in level, at time t14, the second input voltage V2 goes high in level. The program selecting means 86 terminates the first program 92*a* being executed, and selects and executes the third program 92*c*. When the third program 92*c* is executed, the first solenoid coil 24A is supplied with a rated power and a reduced power during two cycles or more, for a period during which the first input signal S1 is at a high level.

When the first input signal S1 goes low in level, at time t15, the first input voltage V1 goes high in level. The program selecting means 86 terminates the third program 92*c* being executed, and selects and executes the first program 92*a*. When the first program 92*a* is executed, both the first solenoid coil 24A and the second solenoid coil 24B are de-energized.

In the solenoid-operated valve controller 10 according to the present embodiment, the first signal line 32A and the second signal line 32B are connected respectively to one end 38*a* of the first solenoid coil 24A and to one end 38*b* of the second solenoid coil 24B, whereas the other end 40*a* of the first solenoid coil 24A and the other end 40*b* of the second solenoid coil 24B are electrically connected in common to the switch 30. At least one of the first and second solenoid coils 24A, 24B, which corresponds to signal states of the first input signal S1 and the second input signal S2 that are supplied respectively to the first signal line 32A and the second signal line 32B, is selected, and the switch 30 is turned on and off in order to control the selected solenoid coil 24A or 24B. The solenoid-operated valve 12 having the first solenoid coil 24A and the second solenoid coil 24B, which is referred to as a double-solenoid-operated valve, can be reduced in size, can be designed to accommodate a reduced space for installing the control circuit, and can be reduced in cost.

Even when the first solenoid coil 24A and the second solenoid coil 24B have been simultaneously selected depending on the signal states of the first input signal S1 and the second input signal S2, the switch 30 is turned off. Therefore, the first solenoid coil 24A and the second solenoid coil 24B are prevented from being energized simultaneously, thus allowing the solenoid-operated valve 12 to operate more reliably.

The control circuit 34 turns the switch 30 on and off, in order to energize the selected solenoid coil in the rated power mode, and thereafter in the reduced power mode. When the second program 92*b* is selected, the rated power mode and the reduced power mode are both performed in one cycle, for a period during which one solenoid coil is selected. Consequently, the running cost of the solenoid-operated valve 12 is effectively lowered.

When the third program 92*c* is selected, the rated power mode and the reduced power mode are performed repeatedly during two cycles or more. Consequently, the running cost of the solenoid-operated valve 12 is effectively lowered, while in addition, the movable members are reliably held in position even if an external shock is applied to the solenoid-operated valve 12 during the period in which one solenoid coil is selected. Specifically, the movable members are reliably held in position even when the solenoid-operated valve 12 is operated in the reduced power mode, and the movable members remain held in position even if an external shock is applied to the solenoid-operated valve 12 during operation thereof.

The sum (cyclic period Ts) of the first period T1 for the rated power mode and the second period T2 for the reduced power mode may be established so as to be shorter than a period of time which is required for the fluid pressure device to start changing the fluid passages, as measured from the time when the first and second movable members 18A, 18B are shifted. With the cyclic period Ts being thus established, even if the solenoid-operated valve 12 undergoes an external shock during the second period T2 for the reduced power mode, the rated power mode still is performed before the fluid passages of the fluid pressure device are changed, so that the fluid pressure device is prevented from making unexpected fluid passage changes.

According to the present embodiment, one of a plurality of prepared energization patterns (the second program 92*b* and the third program 92*c*), which corresponds to an input condition at the dedicated terminal Gc of the control circuit 34, is selected, whereby the switch 30 is turned on and off based on the selected energization pattern. Such energization patterns can be established depending on the requirements of usage for the solenoid-operated valve 12, e.g., a location where the installed solenoid-operated valve 12 must be highly reliable, or a location where the installed solenoid-operated valve 12 may be less reliable. Accordingly, the solenoid-operated valve 12, having the first solenoid coil 24A and the second solenoid coil 24B, may be highly versatile in its manner of use.

In the illustrated embodiment, the first period T1 for the rated power mode, the second period T2 for the reduced power mode, the OFF period T3 for the reduced power mode, and the ON period T4, are fixed values set within the second program 92b and the third program 92c.

However, different solenoid-operated valves 12 tend to produce largely varying magnetic coercive forces, and if a constant current value is established for the reduced power mode, then the first movable member 18A or the second movable member 18B may possibly not be held in position in the reduced power mode. Therefore, in order to avoid this possibility, the magnetic coercive force of the solenoid-operated valve 12 may be measured, a holding current value for holding the first movable member 18A or the second movable member 18B in position may be determined, and the first period T1 for the rated power mode, the second period T2 for the reduced power mode, the OFF period T3 for the reduced power mode, and the ON period T4, may all be determined so as to match the solenoid-operated valve 12. The periods may be changed by making on-board changes to the program data stored in the memory 90 storing the second program 92b and the third program 92c, which may be a flash memory or the like. Since such on-board program changes may be made when the solenoid-operated valve controller 10 is shipped out of factory, or even after the solenoid-operated valve controller 10 has been delivered to the user, the solenoid-operated valve controller 10 is highly convenient to use.

Alternatively, a plurality of second programs 92b and a plurality of third programs 92c may be prepared, having different first periods T1 and different second periods T2, wherein a plurality of dedicated terminals are provided for selecting one of the second programs 92b and one of the third programs 92c, which match the solenoid-operated valve 12.

In the illustrated embodiment, the detection circuit 58 comprises two npn transistors, i.e., the first transistor 60a and the second transistor 60b, whose emitters are connected in common. However, the detection circuit may also comprise a resistive voltage divider, which applies the first input signal S1 from the first input terminal 36A and the second input signal S2 from the second input terminal 36B directly to the first control input terminal Gi1 and to the second control input terminal Gi2, respectively, of the control circuit 34. CR low-pass filters or the like may be connected to the detection circuit, for reducing chattering and noise occurring in the first input signal S1 and the second input signal S2.

Although a certain preferred embodiment of the present invention has been described above, it should be understood that various changes and modifications may be made to the embodiment without departing from the scope of the invention as set forth in the appended claims.

What is claimed is:

1. A solenoid-operated valve controller for controlling a double-solenoid-operated valve having a plurality of solenoid coils disposed on respective ends of a valve spool, comprising:
   a switch comprising a transistor having a drain terminal, a source terminal, and a gate terminal;
   a plurality of signal lines wired in association with the solenoid coils, respectively;
   said signal lines being connected to respective ends of said solenoid coils;
   said solenoid coils having other ends, which are electrically connected in common to said drain terminal of said transistor; and
   a control circuit for selecting at least one of said solenoid coils and also permitting simultaneous selection of said solenoid coils, which corresponds to signal states of a plurality of input signals that are supplied respectively to said signal lines, and turning on and off said switch in order to control said selected one of the solenoid coils,
   wherein said switch is turned off during a period in which said solenoid coils are simultaneously selected by said control circuit.

2. A solenoid-operated valve controller according to claim 1, wherein said control circuit selects at least two of said solenoid coils, which corresponds to signal states of the plurality of input signals that are supplied respectively to said signal lines, and turns off said switch for a period in which said control circuit selects said at least two of said solenoid coils.

3. A solenoid-operated valve controller according to claim 1, wherein said control circuit turns on and off said switch in order to energize said selected one of the solenoid coils in a rated power mode, in which said selected one of the solenoid coils is energized at a 100% duty cycle with an electric power sufficient to move a movable member in said selected one of the solenoid coils, and thereafter energizes said selected one of the solenoid coils in a reduced power mode, in which said selected one of the solenoid coils is energized at a duty cycle smaller than said 100% duty cycle in said rated power mode.

4. A solenoid-operated valve controller according to claim 3, wherein said control circuit energizes said selected one of the solenoid coils in said rated power mode and said reduced power mode during one cyclic period, and turns on and off said switch during said one cyclic period, which is assigned to a period in which said one of the solenoid coils is selected.

5. A solenoid-operated valve controller according to claim 4, wherein said one cyclic period is shorter than a period of time required for a fluid pressure device that is connected to said solenoid-operated valve for changing fluid passages based on shifting movement of the movable members of said solenoid-operated valve to start changing the fluid passages, as measured from the time when said movable members are shifted.

6. A solenoid-operated valve controller according to claim 3, wherein said control circuit energizes said selected one of the solenoid coils in said rated power mode and said reduced power mode during one cyclic period, and turns on and off said switch during two or more of said cyclic periods, which are assigned to a period in which said one of the solenoid coils is selected.

7. A solenoid-operated valve controller according to claim 6, wherein said one cyclic period is shorter than a period of time required for a fluid pressure device that is connected to said solenoid-operated valve for changing fluid passages based on shifting movement of the movable members of said solenoid-operated valve to start changing the fluid passages, as measured from the time when said movable members are shifted.

8. A solenoid-operated valve controller according to claim 1, wherein said control circuit selects one of a plurality of prepared energization patterns, which corresponds to an input condition at a dedicated terminal of said control circuit, and turns on and off said switch based on the selected one of the energization patterns.

9. A solenoid-operated valve controller according to claim 8, wherein said control circuit turns on and off said switch during one cyclic period in order to energize said selected one of the solenoid coils in a rated power mode, in which said selected one of the solenoid coils is energized at a 100% duty cycle with electric power sufficient to move a movable member in said selected one of the solenoid coils, and thereafter energizes said selected one of the solenoid coils in a reduced power mode, in which said selected one of the solenoid coils is energized at a duty cycle smaller than said 100% duty cycle in said rated power mode; and     wherein said prepared energization patterns include a first energization pattern for assigning said one cyclic period to a period during which said one of the solenoid coils is selected, and a second energization pattern for assigning at least two of said cyclic periods to the period during which said one of the solenoid coils is selected.

10. A solenoid-operated valve controller according to claim 1, wherein said control circuit selects one of a plurality of prepared energization patterns, which corresponds to a condition stored in a memory incorporated in said control circuit, and turns on and off said switch based on the selected one of the energization patterns.

11. A solenoid-operated valve controller according to claim 10, wherein said condition stored in said memory comprises a condition written into said memory after said control circuit has been installed on a wiring board.

12. A solenoid-operated valve controller according to claim 10, wherein said control circuit turns on and off said switch during one cyclic period in order to energize said selected one of the solenoid coils in a rated power mode, in which said selected one of the solenoid coils is energized at a 100% duty cycle with an electric power sufficient to move a movable member in said selected one of the solenoid coils, and thereafter energizes said selected one of the solenoid coils in a reduced power mode, in which said selected one of the solenoid coils is energized at a duty cycle smaller than said 100% duty cycle in said rated power mode; and     wherein said prepared energization patterns include a first energization pattern for assigning said one cyclic period to a period during which said one of the solenoid coils is selected, and a second energization pattern for assigning at least two of said cyclic periods to the period during which said one of the solenoid coils is selected.

13. A solenoid-operated valve controller according to claim 12, wherein said one cyclic period is shorter than a period of time required for a fluid pressure device that is connected to said solenoid-operated valve for changing fluid passages based on shifting movement of the movable members of said solenoid-operated valve to start changing the fluid passages, as measured from the time when said movable members are shifted.

14. A solenoid-operated valve controller according to claim 1, wherein said signal lines also operate as corresponding power lines for said solenoid coils.

\* \* \* \* \*